Jan. 26, 1971  T. R. SANTELLI  3,558,751
METHOD OF MAKING A FOAMED CONTAINER HAVING AN
INTEGRAL NECK PORTION
Filed July 22, 1964  10 Sheets-Sheet 5
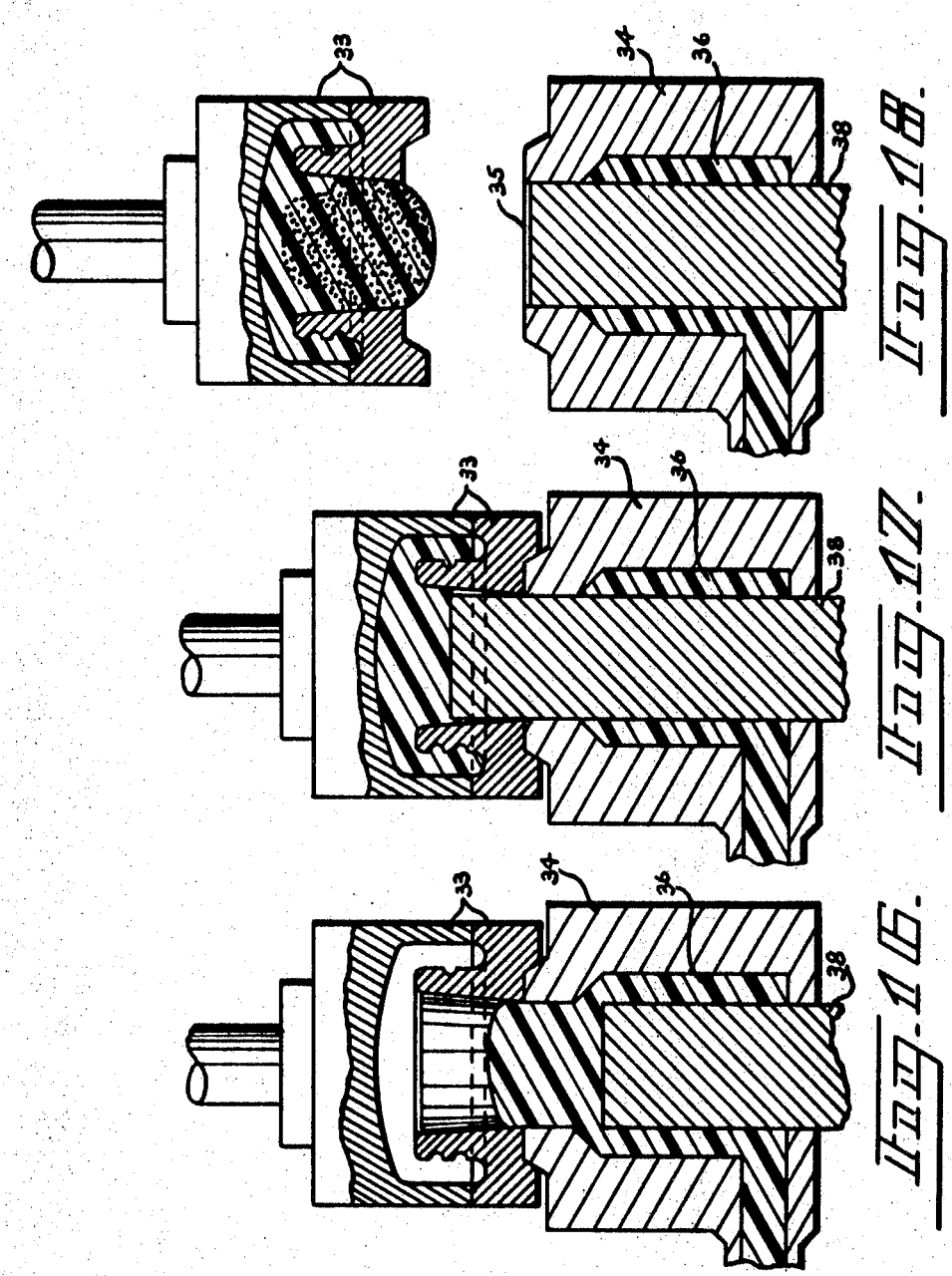
INVENTOR.
THOMAS R. SANTELLI
BY
ATTORNEYS

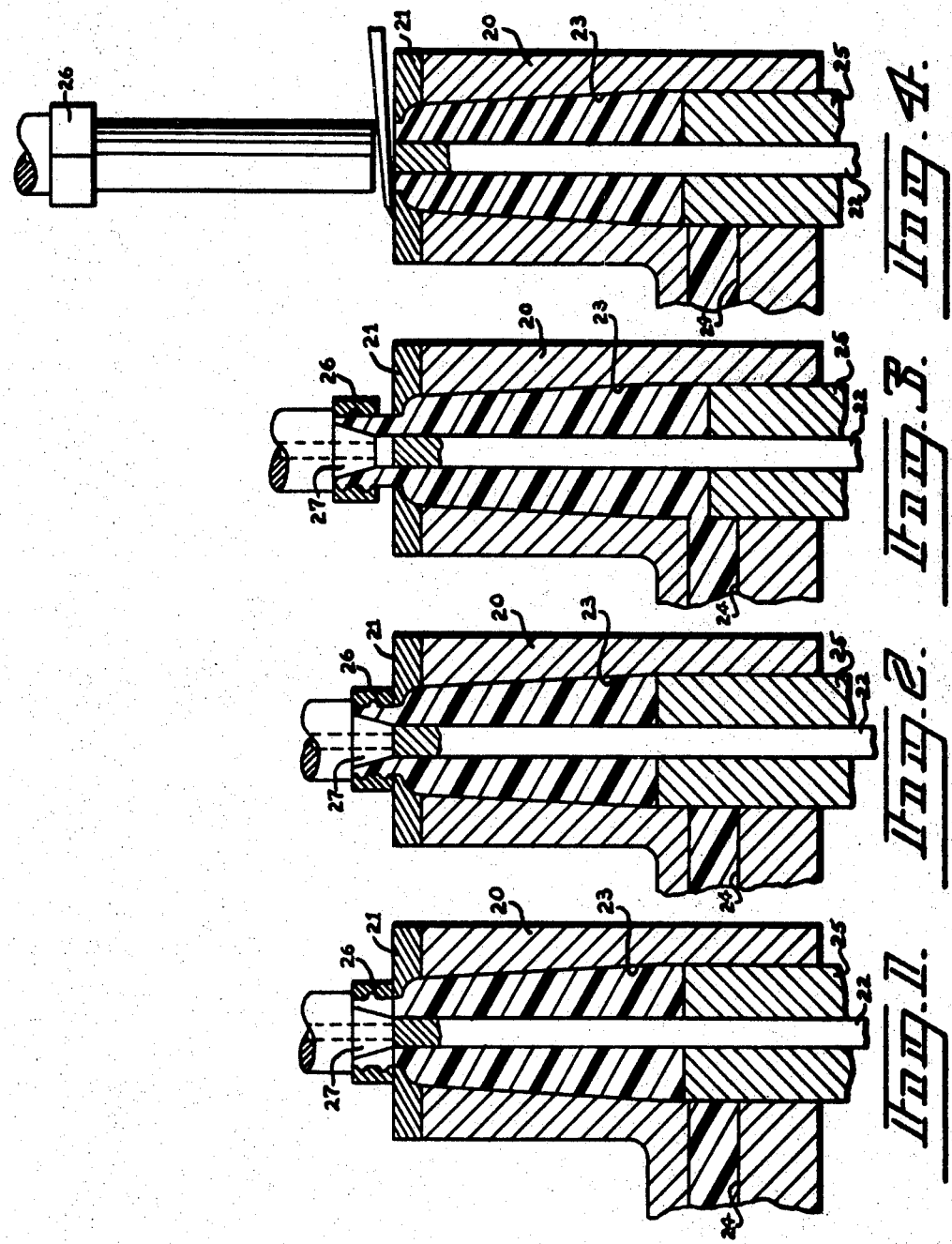

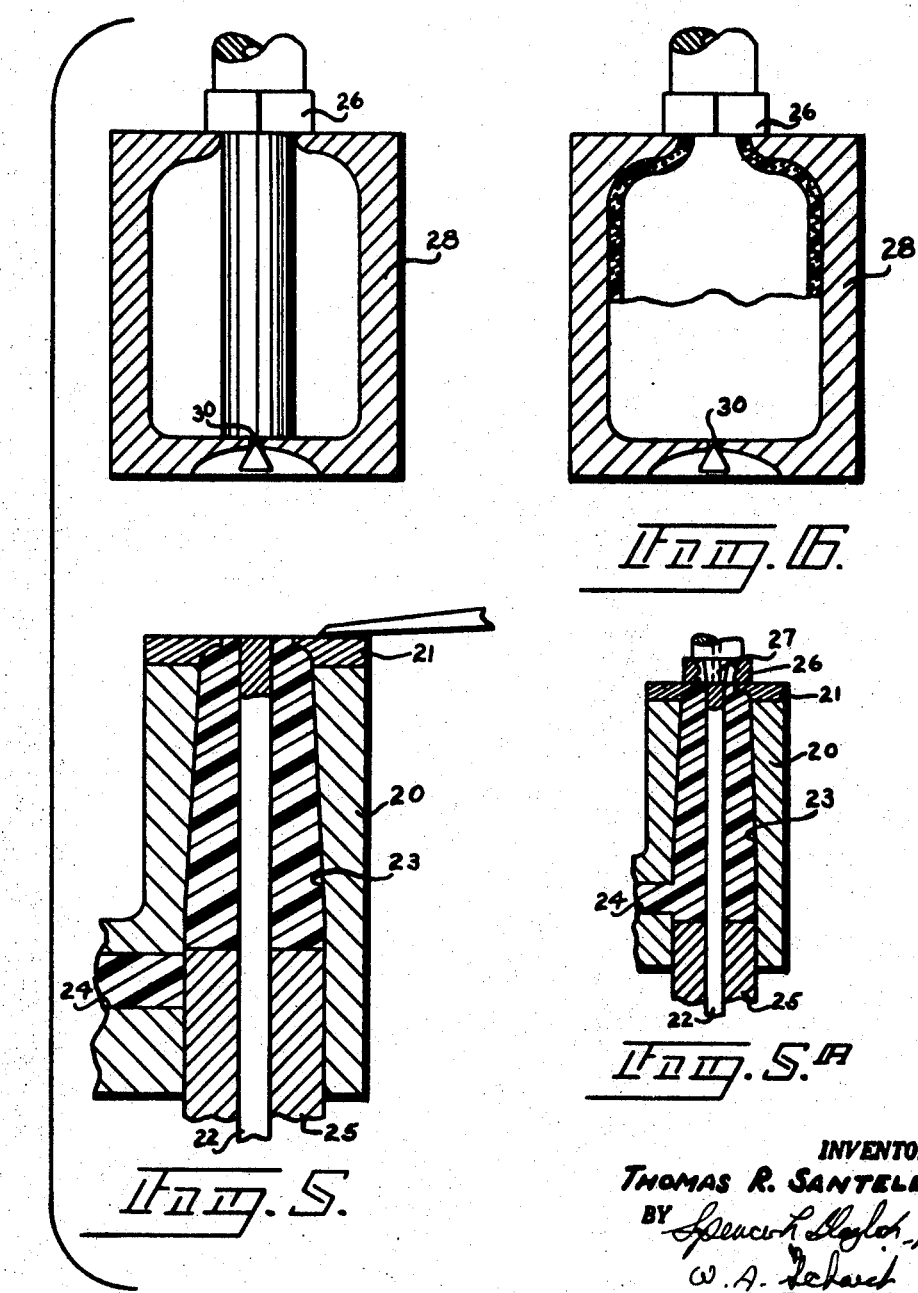

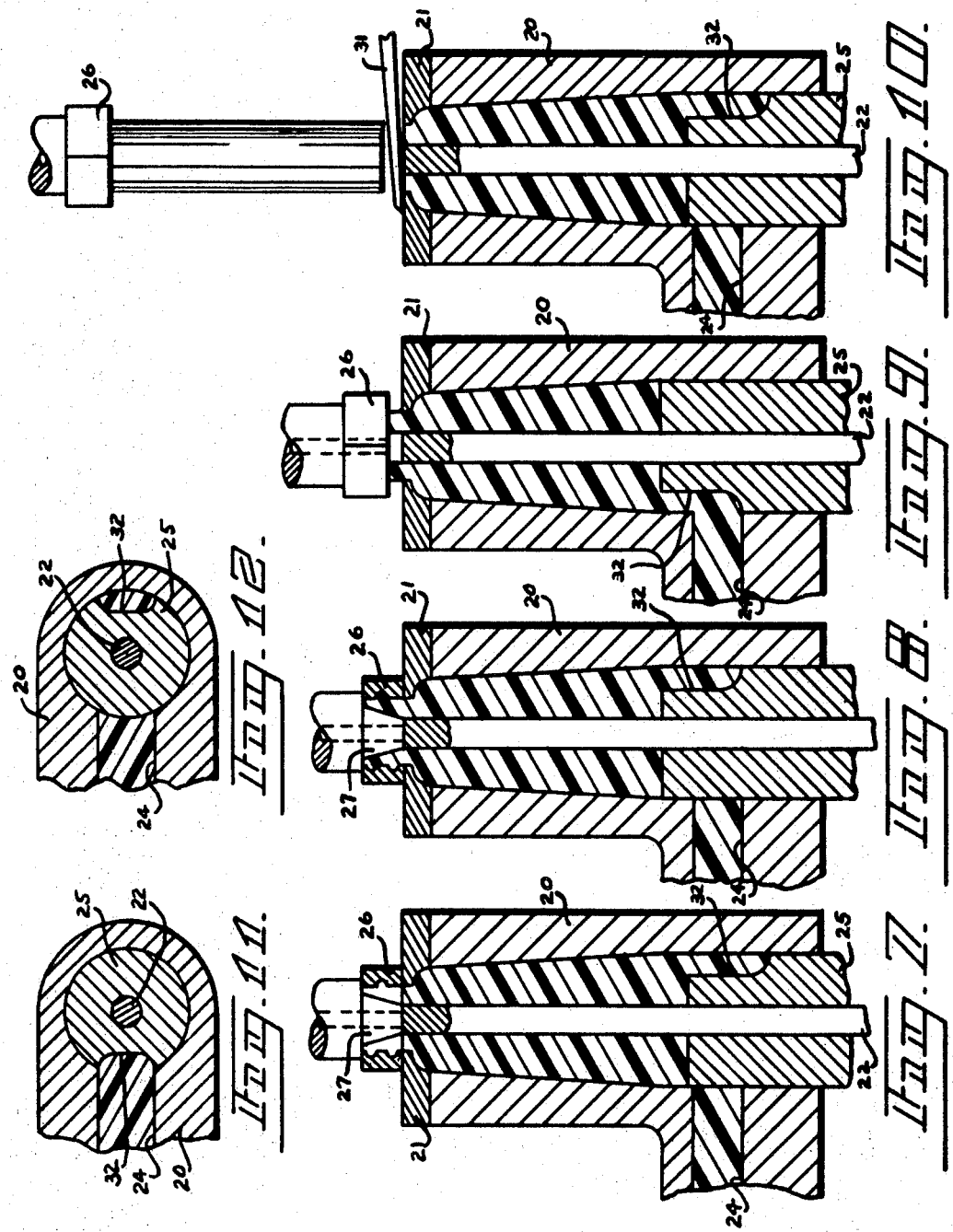

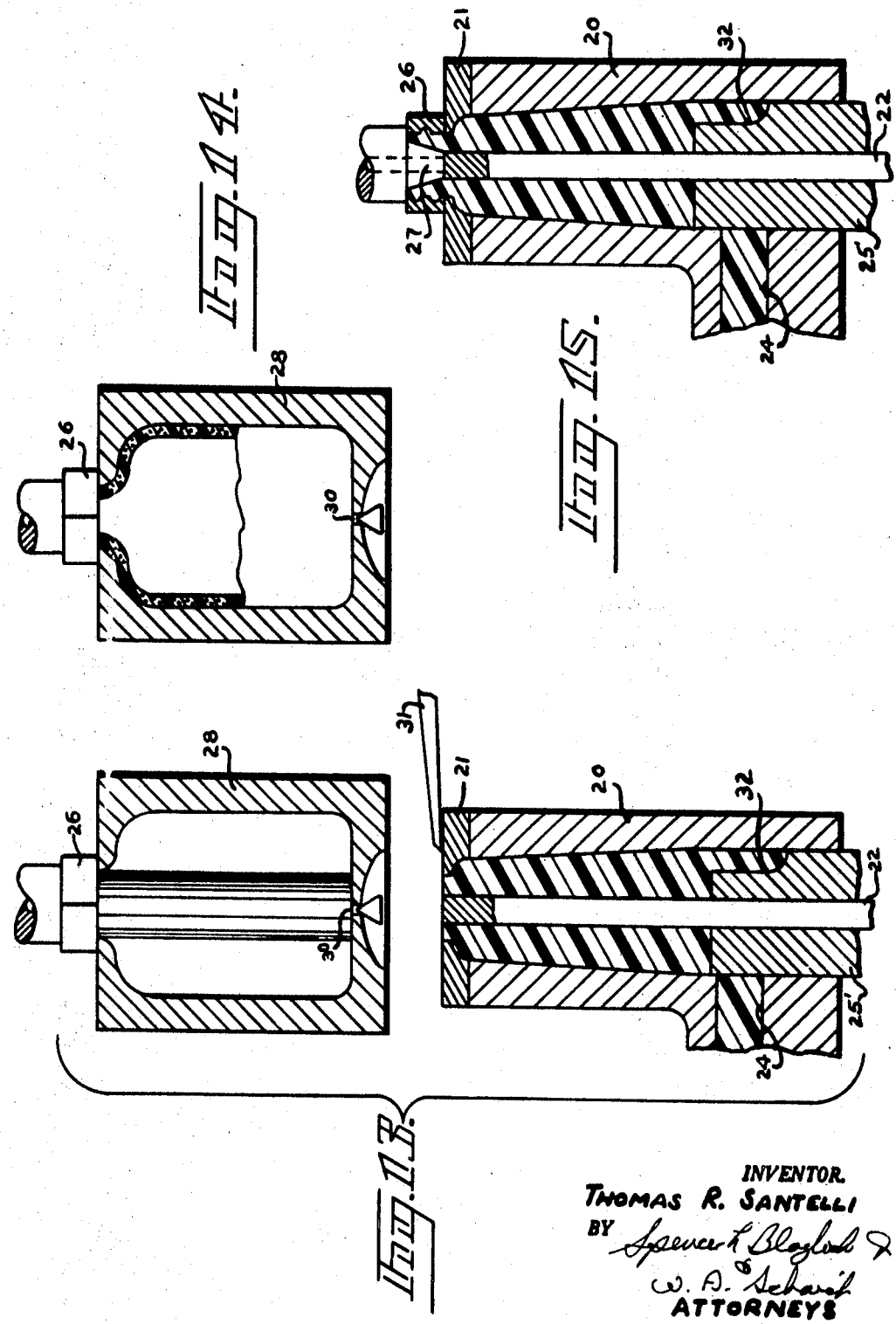

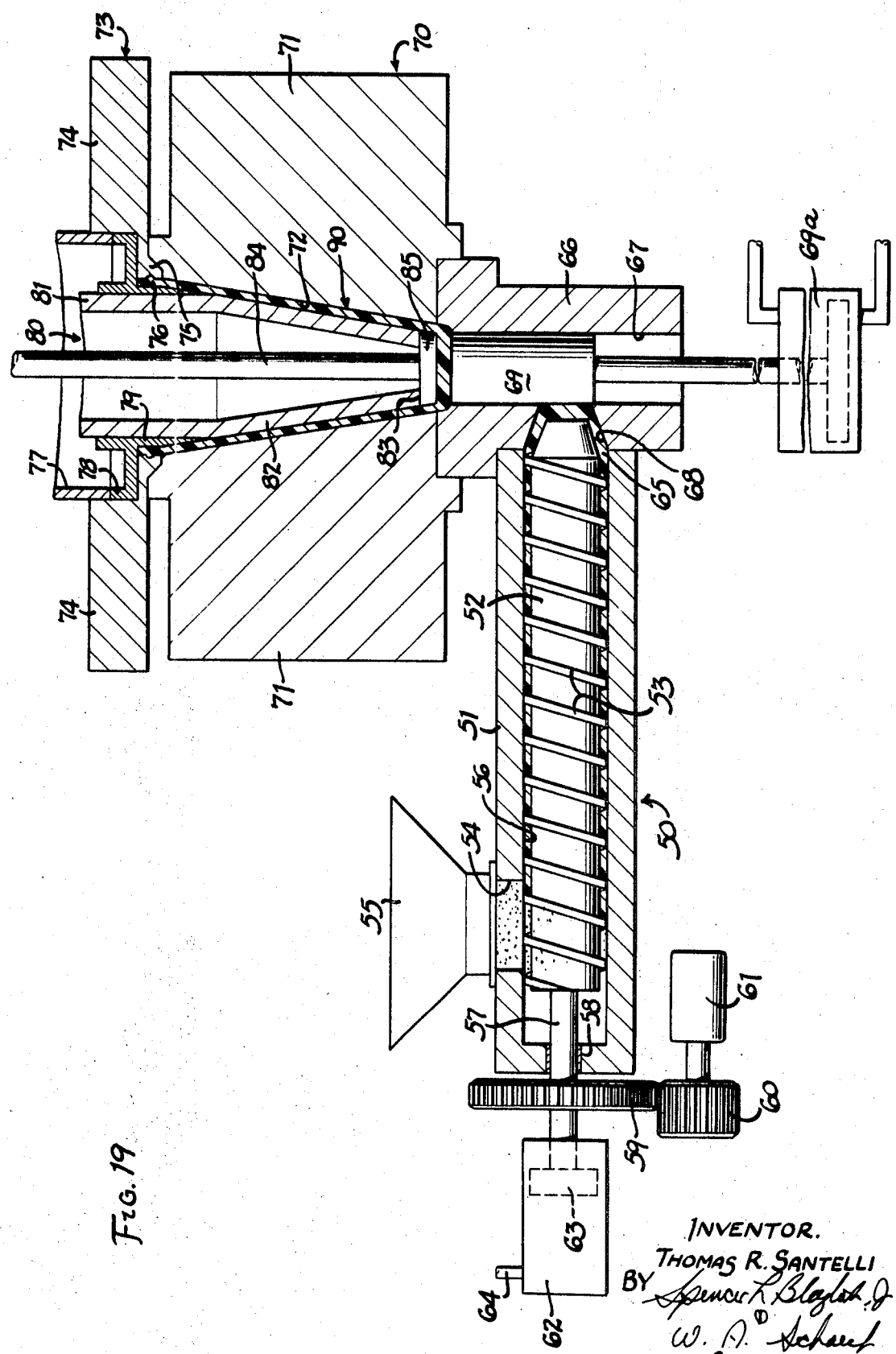

Jan. 26, 1971  T. R. SANTELLI  3,558,751
METHOD OF MAKING A FOAMED CONTAINER HAVING AN
INTEGRAL NECK PORTION
Filed July 22, 1964  10 Sheets-Sheet 7

INVENTOR.
THOMAS R. SANTELLI
BY
ATTORNEYS

Jan. 26, 1971  T. R. SANTELLI  3,558,751
METHOD OF MAKING A FOAMED CONTAINER HAVING AN
INTEGRAL NECK PORTION
Filed July 22, 1964  10 Sheets-Sheet 9

INVENTOR.
THOMAS R. SANTELLI
BY
ATTORNEYS

Jan. 26, 1971 T. R. SANTELLI 3,558,751
METHOD OF MAKING A FOAMED CONTAINER HAVING AN
INTEGRAL NECK PORTION
Filed July 22, 1964 10 Sheets-Sheet 10

INVENTOR.
THOMAS R. SANTELLI
BY
ATTORNEYS

United States Patent Office 3,558,751
Patented Jan. 26, 1971

3,558,751
METHOD OF MAKING A FOAMED CONTAINER HAVING AN INTEGRAL NECK PORTION
Thomas R. Santelli, Sylvania, Ohio, assignor to Owens-Illinois, Inc., a corporation of Ohio
Continuation-in-part of application Ser. No. 847,144, Oct. 19, 1959. This application July 22, 1964, Ser. No. 389,511
Int. Cl. B29d 27/00
U.S. Cl. 264—45
4 Claims

ABSTRACT OF THE DISCLOSURE

A method for producing a foamed plastic container having a body portion and a neck portion which are integrally formed. The body portion is essentially cellular and the neck portion is essentially noncellular. The body portion has a dense skin on its surface. The container is blow molded from an injection molded parison.

---

This application is a continuation-in-part of Ser. No. 847,144, filed Oct. 19, 1959, and new Pat. No. 3,144,493.

This invention relates to a method for forming plastic articles having an end portion in substantially unexpanded or unfoamed condition with the balance of the article being integral therewith and in expanded or foamed condition.

Various articles made of foamed or cellular plastics are desirable because of the various unique properties of foamed plastics, such as cushioning and insulating effects or because of the savings in material which can be realized when producing the article from a plastic in cellular form. However, it has not been desirable to form many objects from cellular plastics in the past because some objects require greater strength or rigidity in certain areas or portions than can be offered by the particular cellular plastic in question.

Typical of such articles or objects which have not been formed on a commercial basis of foamed or cellular plastics are containers of the type having a "finish" or neck portion for receiving a closure cap or lid. Since the closures are normally applied by automatic filling and closing equipment the finish must be accurately formed and, further, the finish must be nonporous and have a densified exterior surface and lip to receive the closure, while the interior surface of the finish must also be nonporous and smooth for accurate filling and for nondrip dispensing of the container contents.

If an attempt were made to form the finish portion of a container in a conventional "free extrusion" machine, i.e., from an extruded tube or sheet of foamed or cellular plastic material, a dense, smoothly surfaced finish could be formed only by crushing or otherwise disrupting the already foamed, cellular structure by compression molding. Such crushing of the cellular structure would destroy the preformed tube and result in an inadequate finish, both from the standpoint of structural strength and from the standpoint of its structural integrity with the remainder of the container structure. If the entire container, including the finish, were uniformly foamed or cellular, a finish of lesser strength, of inaccurate contour, and of roughened, nonsealable exterior surfaces would be provided, and a commercially unacceptable product would again result.

The present invention now proposes the provision of a plastic container having a body portion and a neck portion which are integrally formed, the body portion being essentially cellular and the neck portion being essentially noncellular and substantially more dense than the body portion, the neck or finish portion having dense, glazed interior and exterior surfaces confining therebetween any cellular material which may occur in the neck portion.

Such a container is provided by the method of the present invention which utilizes material which is plasticized while containing an intimately dispersed foaming agent capable of liberating a gas in the plasticized material when the material is subjected to a plasticizing temperature and a relatively low pressure, i.e., less than the vapor pressure of the gas liberated in the material by the foaming agent. The method contemplates the injection molding of at least the finish portion of the container at a super-atmospheric pressure which is greater than the vapor pressure of the gas liberated in the material by the blowing agent, so that foaming is inhibited in the finish portion and any other portions of the container which are formed by injection molding.

Subsequently, the injection molding pressure is released after at least the finish portion has been injection molded and a blowable bubble is formed from the plasticized material, this blowable bubble being enclosed within a blow mold and inflated to form the bubble to the final configuration of the body portion of the container.

During the formation of the blowable bubble or during the enclosing of the blowable bubble in the blow mold or during the blow molding operation, foaming of the plasticized material is accommodated, so that the final blown body portion of the container is cellular and possesses all of the heretofore recited advantages, such as the cushioning and insulating capabilities of the cellular structure, the substantial savings of material because of the lower density of the cellular structure, and the like.

Of course, after the release of the injection molding pressure, some foaming may occur, even within the finish portion of the container or other article, since the material which has been injection molded still contains the blowing agent which may effect cellulation in the still-hot inner portions of the injected finish under the lessened pressure. However, any foaming or cellular structure which may result will be confined between heavy, densified surface layers formed by contact of the material with the chill surfaces of the injection mold, and all of the surfaces contacting the injection mold will be finally stabilized prior to the release of the injection molding pressures. Thus, the finish will possess all of the advantages heretofore recited of contour accuracy, surface smoothness, structural rigidity and the like, even though some small amount of foaming may occur within the finish portion.

It is, therefore, an object of the invention to provide a method for producing a cellular plastic article having an end portion which is in a substantially unexpanded condition and integral with the cellular portion of the plastic article.

An additional object of the present invention is the provision of a method of making a container or the like having an injection molded finish portion and a blow molded body portion, the article being formed of a material having incorporated therein a blowing agent, by the sequential injection molding of the finish portion under conditions inhibiting foaming of the plasticized material, followed by the formation of a blowable bubble which is subsequently blown to shape, the forming and blowing being accomplished under conditions which accommodate foaming of the body portion to a cellular structure integral with the finish portion, and confining any cellular structure which might occur in the neck portion, or in the finish portion between densified, stable, noncellular surfaces.

Yet another and no less important object of the present invention is the provision of a blow molded article such as a container having a finish portion integral with a blown body portion, the finish portion having dense, glazed interior and exterior surfaces between which is confined any cellular material occurring in the finish portion while the body portion of the article is essentially cellular in nature.

Other objects and advantages of the invention will become apparent from a consideration of the accompanying disclosure and the drawings.

According to the invention, there is provided a method which comprises providing a quantity of hot plasticized plastic material containing an intimately dispersed foaming or cellulating agent, forming a substantially unexpanded, essentially noncellular shaped end portion of an article from a portion of said plastic material under shaping conditions which prevent any substantial foaming of said portion of said foaming agent, from another portion of said quantity of plastic material forming the balance of said article integral with said shaped end portion under conditions whereby said second portion of said article is expanded into a cellular structure by the action of said foaming agent.

Further, according to the invention there is produced a plastic article having a cellular portion integral with an end portion formed from the same plastic composition as said cellular portion, said end portion being in a substantially solid or unexpanded, noncellular condition.

Blowing or foaming agents which are dispersed in plastics are of two main general types. In the first type the blowing agent is a chemical blowing agent, that is, one which evolves a gas under the influence of heat by chemical reaction or chemical decomposition. The second type of blowing agent is a physical blowing agent, such as a volatile liquid dispersed in the plastic, such liquid forming a gas or vapor under the influence of elevated temperatures and/or lowered pressures. Such foaming agents are well known and will not be discussed in detail here. Either type of blowing agent is applicable in the present invention, since either type is capable of liberating a gas in the material so long as the vapor pressure of the gas so liberated is greater than the external pressure exerted on the material.

Chemical foaming agents are usually employed at a concentration of from about 0.5 to 10 weight percent of the plastic composition, including the foaming agent, although higher or lower amounts are applicable.

The nature of the invention will be better understood from a description of the drawings which illustrate several suitable types of apparatus for carrying out the method and producing the article of the invention.

Referring to the accompanying drawings:

FIGS. 1 through 6, inclusive, are sectional elevational views of one suitable apparatus for performing the method, showing the parts in different positions corresponding to various steps of the method;

FIGS. 7 through 10, and 13, 14 and 15, inclusive, are sectional elevational views of another apparatus for performing the method, showing the parts in different positions corresponding to the various steps in the method;

FIG. 11 is a sectional view at the line 11—11 of FIG. 9;

FIG. 12 is a sectional view at the line 12—12 of FIG. 7;

FIGS. 16, 17 and 18 illustrate sectional views of another apparatus siutable for effecting the method of the invention, showing the parts in different positions.

Figure 23:
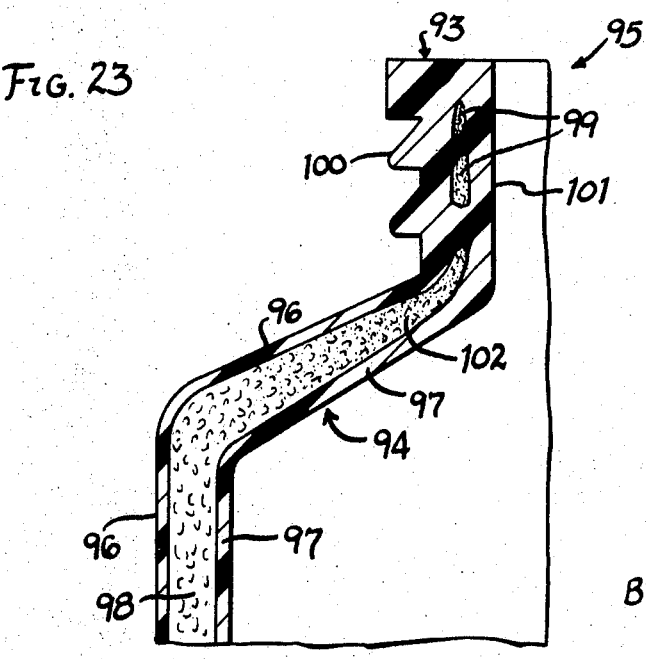
Figure 24:
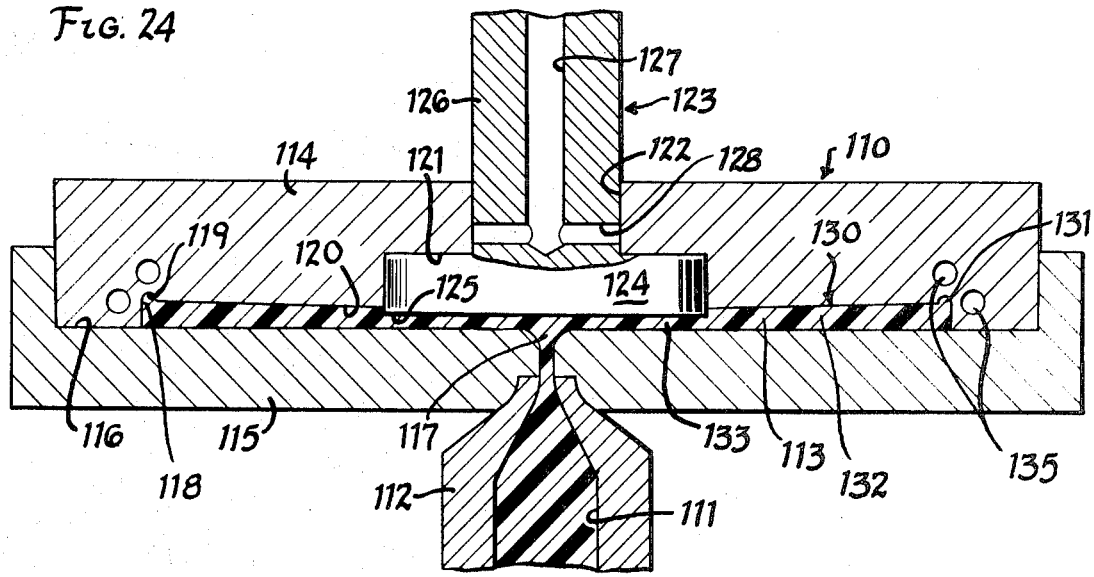
Figure 25:
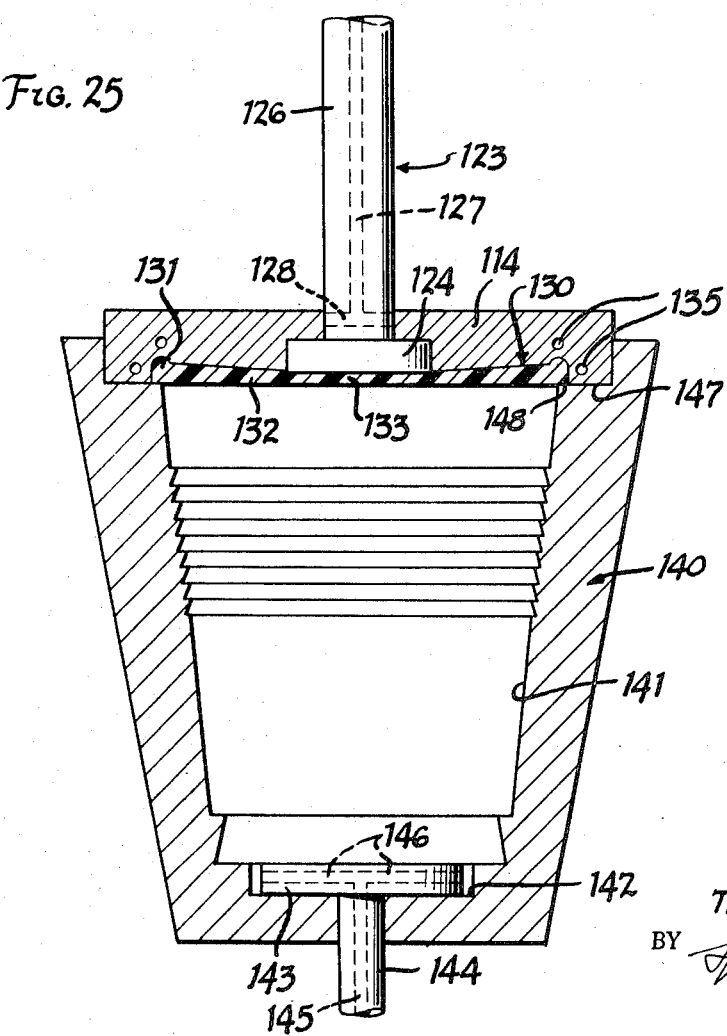
Figure 27:
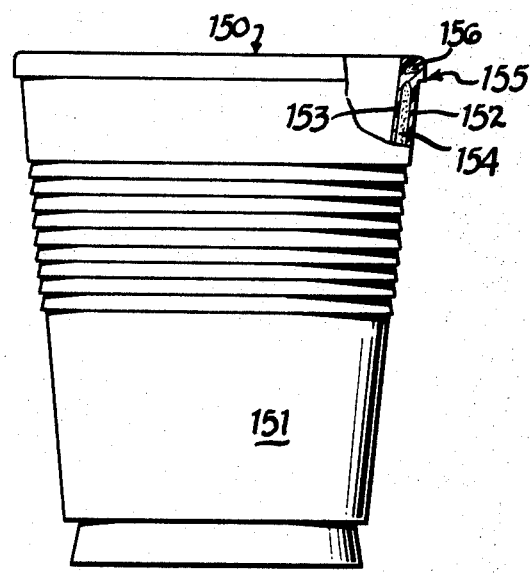
Figure 26:
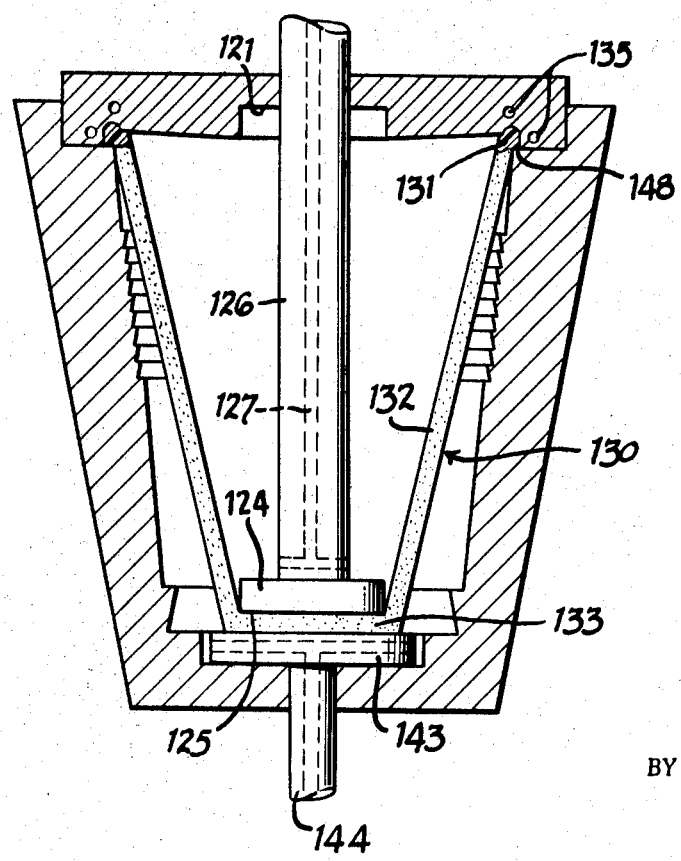

FIGS. 19 through 22, inclusive, are sectional elevational views of a modified form of apparatus, capable of performing the method, these views illustrating successive steps of the method;

FIG. 23 is a fragmentary vertical sectional view of a container of the present invention manufactured by carrying out the steps of the process illustrated in FIGS. 19 through 22;

FIGS. 24, 25 and 26 are vertical sectional views illustrating still another form of apparatus capable of carrying out a modified form of the method of the present invention, these views illustrating successive steps of the method; and FIG. 27 is a view illustrating an article of the present invention manufactured by the method as illustrated in FIGS. 24 through 26.

THE EMBODIMENT OF FIGS. 1 THROUGH 6

As shown in FIGS. 1 through 6, an apparatus for performing the method includes a body 20 having a vertical opening therethrough and an orifice ring 21 overlying the vertical opening. A mandrel 22 is positioned in the opening thereby forming a tubular cavity 23. The tubular cavity 23 is in communication with the outlet of a plasticizer and extruder (not shown) through a channel 24.

A sleeve 25 surrounds the mandrel 22 and is reciprocable by means (not shown) from a position above and overlying the channel 24 to a lower position whereby the tubular cavity 23 can be brought into and out of communication with the channel 24.

A partible neck mold 26 and a hollow core 27 are mounted above the body 20 for axial movement into and out of alignment with the open end of the cavity 23. A partible finishing mold 28 (FIGS. 5 and 6) is provided for expanding the plastic tube to finished form, as hereinafter described. The bottom of the mold sections are beveled at 29 and spaced apart at 30 in order to pinch the plastic material and seal the end thereof.

At the beginning of the operation of the apparatus shown in FIGS. 1 through 6, a quantity of hot plasticized material containing foaming agent material, and sufficient to fill the tubular cavity, is introduced from the source of plastic through the channel 24 to the cavity. The mass of plastic material in the tubular cavity is isolated from the parent mass of plastic material by movement of the sleeve 25 upwardly across the channel 24. The apparatus is then in position for the beginning of the cycle and the neck mold 26 is brought into contact with the body 20, the core 27 contacting the mandrel 22 (FIG. 1).

The sleeve 25 is then moved upwardly under controlled pressure a sufficient distance to force a portion of the plastic material in the tubular cavity upwardly in order to fill the neck mold 26 and form the finish or end portion of the article (FIG. 2). The sleeve 25 is then retracted downwardly to reestablish communication with the plastic material (FIG. 3). Simultaneously, the neck mold is moved upwardly and axially away from the end of the cavity. The pressure of plastic material from the parent mass forces plastic material into the tubular cavity, and prevents any substantial expansion by foaming of the plastic in the neck mold. Also, the mold chills the plastic sufficiently that expansion is avoided when the neck mold is later removed. A portion of the plastic material in the cavity 23 is displaced out of the open end of the cavity, thereby forming a length of tubing integral with the neck. As this tubing is formed, the foaming agent therein causes expansion into a tube of foamed or cellular plastic as it issues from the cavity. As the desired length of tubing is formed, the sleeve is again moved upwardly to cut off or resegregate the parent mass from the plastic material in the tubular cavity. A shear blade 31 is then moved across the orifice to sever the length of tubing from the plastic material in the tubular cavity (FIG. 4).

The sections of the hollow mold 28 may then be closed about the plastic material, thereby pinching the lower end of the tubing. The foamed tubing can then be expanded to the confines of the mold by applying fluid under pressure through the hollow core 27 (FIGS. 5 and 6).

After the tubing has been severed from the plastic material in the cavity (FIG. 4), the apparatus is again in position for beginning the cycle by bringing a neck mold into contact with the body 20 and forming the neck finish by moving the sleeve 25 upwardly.

A modification of the method can be performed by retracting the sleeve 25 at the beginning of the cycle as shown in FIG. 5a to permit a limited quantity of plastic to enter the tubular cavity and then moving the sleeve upwardly, simultaneously isolating the quantity of plastic in the tubular cavity and forcing plastic into the neck mold positioned over the cavity, as shown by FIGS. 2 and 8. The sleeve is then retracted and the neck mold moved axially away from the cavity to form a length of tubing integral with the neck, in the same manner as heretofore described. As the desired length of tubing is formed, the sleeve is again moved upwardly, as in FIG. 4, or rotated as in FIG. 10, to isolate or resegregate the plastic material in the cavity and the length of tubing is severed. The cycle of operations can then again be started by the retraction of the sleeve.

THE EMBODIMENT OF FIGS. 7 THROUGH 15

Another apparatus for performing the method is shown in FIGS. 7 through 15, inclusive. In this apparatus the sleeve 25' is provided with a slot or groove 32 extending longitudinally along the outer surface of the sleeve to the upper end thereof. In the operation of this apparatus, the tubular cavity is initially filled with plastic material containing foaming agent, as in the form of the apparatus shown in FIGS. 1 through 6. The sleeve 25' is in the position shown in FIG. 7 wherein the plastic material in the tubular cavity is isolated or segregated from communication with the parent mass and the groove 32 is in a position out of communication with the channel 24 (FIG. 12). The sleeve 25' is then moved upwardly to force plastic material into the neck mold, thereby forming the neck finish (FIG. 8). The sleeve is then rotated to bring the groove 32 into communication with the channel 24, thereby permitting plastic material to flow from the parent mass to the tubular cavity (FIGS. 9, 11). Simultaneously with this action, the neck mold is moved axially away from the cavity, thereby forming a length of tubing integral with the neck finish by the flow of plastic material out of the tubular cavity. During the forming of the tubing the sleeve is retracted into its lower position. As the desired length of tubing is formed, the sleeve is again rotated to bring the groove 32 out of register with the channel 24 isolating or resegregating the plastic material in the cavity from the parent mass (FIG. 10).

The neck finish and integral tubing can then be severed (FIG. 10) and sealed and expanded, as shown in FIGS. 13 and 14, by closing the mold sections and supplying fluid under pressure through the core.

At the severing of the tube from the material in the tubular cavity, the various parts are again in position for application of pressure to the mass of plastic in the tubular cavity to force plastic out of the tubular cavity and once again begin the cycle of forming a hollow plastic container.

THE EMBODIMENT OF FIGS. 16, 17 AND 18

In FIGS. 16, 17 and 18 there is illustrated another method for making a somewhat different article according to the invention. This specific article illustrated is a solid, substantially unfoamed bottle cap having a central plug portion in foamed condition. The illustrated apparatus includes a body 34 having a vertical opening therethrough and an orifice 35 overlying the vertical opening. The vertical opening 36 is in communication with the outlet of a plasticizer and extruder (not shown) through a channel 37. A plunger 38 is positioned in opening 36 and is reciprocable by means (not shown) from a position well above opening 35, such as the position shown in FIG. 17 to a lower position, such as shown in FIG. 16, whereby the opening 36 can be brought in and out of communication with orifice 35.

A partible mold 33 is mounted above the body 34 for axial movement into and out of alignment with the orifice 35.

At the beginning of the operation of the apparatus shown in FIGS. 16 through 18, the respective parts of the apparatus are as shown in FIG. 18, except that the mold 33 contains no plastic. A quantity of plastic containing foaming agent has already been introduced into opening 36 through the channel 37 as shown in FIG. 18. The mold is moved into alignment with orifice 35 so as to close the apparatus and the plunger 38 is reciprocated downwardly to a position shown in FIG. 16, allowing a measured quantity of hot plasticized material to move into the opening, as shown in FIG. 16. The plunger is moved to a position shown in FIG. 17, thus ramming the plastic into the mold. The plunger 38 is held in that position for a short period. Then mold 33 is again moved upwardly to the position shown in FIG. 18, allowing the central portion of the plastic containing a foaming agent to expand downwardly through the channel of the mold to form a foamed core. The plunger 38 is moved to the position shown in FIG. 18, ready for the next cycle. After the molded part has sufficiently hardened, the mold 33 is parted and the molded article removed therefrom.

In the foregoing operation the relatively thin sections of the bottle cap illustrated as being made of solid plastic are cooled sufficiently by the mold 33, while under the pressure of the ram in the position shown in FIG. 17, that the plastic is hardened and the foaming agent in that portion of the plastic is not effective to cause any substantial expansion of the plastic, thus causing this portion of the molded piece to be in a solid, substantially unfoamed, unexpanded condition. Indirect cooling means can be provided in the mold around this portion of the molded article, if desired, to assist in the cooling. The central portion of the plastic in the mold, as shown in FIG. 17, does not become sufficiently cooled during the injection molding step to set up or harden, and when the mold is separated from the plunger and the opening 35, the still-hot, plasticized plastic containing foaming agent foams under the influence of the foaming agent, thus forming the cellular plug structure illustrated.

An advantage of the process of the invention is that there is not a sharp line of demarcation between the fully foamed body and the substantially unexpanded, solid end portion of the article produced according to the process. Thus, there is a gradual decrease in the bulk density from the solid end portion to the fully foamed main portion of the fully foamed body. Thus, the articles of the invention might be said to have three zones: a substantially unexpanded end portion, and integral and continuous with said end portion, a cellular portion of the same plastic composition as said end portion; a zone of the cellular portion adjacent the unexpanded end portion having a higher bulk density than the bulk of the cellular portion of the article. The gradual decrease in density in this intermediate zone gives a superior product in that the strength on flexing is increased because there is no sharp line of demarcation between the solid and the fully foamed portions.

The following examples illustrate the methods and articles made from various thermoplastics, but the examples are illustrative only and are not to be taken as limiting the invention.

EXAMPLE I

Low density polyethylene in particle form containing p,p'-oxybis (benzenesulfonyl hydrazide) as a foaming agent was introduced into a molding machine of the type of FIGS. 1 to 6, where it was heated and plasticized to a workable condition. This foaming agent has a decomposition range of about 150° to 160° C. Bottles were molded using the machine as described in the description of FIGS. 1 through 6. The temperature in channel 24 and tubular cavity 23 was maintained at about 305° F. The pressure during the step shown in FIG. 2 was theoretically about 1800 p.s.i.g., although actual pressure may have been somewhat less due to friction losses. A bottle was molded in the manner described with respect to FIGS. 1 through 6, and the resulting bottle had a cellular foamed structure while the neck or finish was substantially solid and unexpanded.

In the cycle of operations the time of the total cycle was 31 seconds, while the time from the beginning of the cycle shown in FIG. 1 to the time the sleeve 25 reached the position shown in FIG. 3 was 2.6 seconds. Sixty bottles were molded in this manner.

EXAMPLE II

The procedure described in Example I was repeated, but using a high density linear polyethylene having a density of about 0.96 gm./cm. and a melting point of about 260° F. This polyethylene contained 1.0 percent by weight 1,1'-azobis(formamide) as the foaming agent. The temperature in the channel 24 and the cavity 23 was maintained at about 315° F. The bottle again had a substantially solid unexpanded neck or finish portion integral with a cellular body portion.

EXAMPLE III

The procedure of Example I was again repeated but using particulate polystyrene containing pentane intimately dispersed therein as a foaming agent.

The temperature in the channel 24 and the cavity 23 was maintained at about 325° F.

The bottle so produced had a substantially solid, unexpanded neck or finish integral with a foamed body portion of very fine-celled foamed structure.

In the embodiment of the method described with respect to FIGS. 1 through 6, and with respect to FIGS. 7 through 15, the step of blowing with air as in FIGS. 5 and 6 and FIGS. 13 and 14 can be omitted where the dimensions of the foamed body of the article are not desired to be greater than produced by the step shown in FIG. 4 or FIG. 10. The tubular foamed extruded body is merely cooled in place, and can be pinched together at the end, and severed, and removed from the apparatus as a finished article.

The invention has been described as being applied to organic plastic materials. The terms plastic and thermoplastic, as used herein, define any organic material which has the required condition of plasticity to permit expansion and setting in predetermined form.

The terms tubular and tubing, as used herein, are intended to include any hollow shapes in which plastic material can be formed, including noncircular and irregular shapes.

THE EMBODIMENT OF FIGURES 19 THROUGH 23

In the earlier described embodiments of the present invention, only the neck or finish portion of the container has been injection molded in order to yield the dense, smooth, substantially noncellular surface portions which are necessary to the manufacture of a commercially acceptable container. In the embodiment of FIGS. 19 through 23, this concept of injection molding and the formation of smooth, substantially noncellular, dense surface portions is carried even further to yield a container body portion having extremely desirable characteristics, particularly well adapted to the container art.

More specifically, in FIG. 19, a plasticizer-extruder indicated generally at 50, comprises a generally cylindrical barrel 51 having disposed therein a plasticizer-extruder screw 52 provided with a raised helical peripheral thread 53. The screw 52 and the thread 53 are schematically illustrated and are capable of plasticizing pelletized plastic material, such as polyethylene, polystyrene or the like, containing a bowing agent capable of liberating a celluating or foaming gas when subjected to elevated temperatures and relatively low pressures, as heretofore explained.

Such material is supplied to the barrel 51 through a barrel inlet aperture 54 communicating with an upper, gravity-feed hopper 55. The screw 52 is disposed interiorly of the bore 56 of the barrel 51 for both rotational movement and axial displacement. The screw 52 is rotated by means of a drive shaft 57 coaxial with the screw and projecting through an aperture 58 formed in the rear wall of the barrel 51 to carry a spur gear 59 engaging a driving gear 60 driven by suitable means, as by an electric motor 61. The screw is actuated axially by means of an actuating cylinder 62 having disposed therein a piston 63 secured to the shaft 57. The cylinder 62 is fluid pressure actuated by pressurized fluid introduced thereinto through supply lines 64 communicating with the suitable source of such fluid.

The barrel bore 56 communicates at its forward open end 65 with a supply block 66 having a vertical bore 67 therethrough and a transverse passage 68 communicating with the barrel bore end 65. Vertically reciprocable within the bore 67 of the block 66 is an injection ram 69 actuated by a fluid pressure actuated cylinder 69a.

Disposed over the vertical bore 67 is a parison mold indicated generally at 70 and comprising laterally separable parison mold halves 71 cooperatively defining therebetween a parison mold space 72 normally open at its lower end for full communication with the vertical bore 67 of the block 66.

Superimposed over the parison mold 70 is a neck ring mold indicated generally at 73 and comprising a pair of neck mold halves 74 having inwardly projecting flanges 75 cooperably defining therebetween a neck mold space 76 in full communication with the parison mold space 72. Surrounded by the neck mold halves 74 is an upper collar 77 abutting a lower neck mold sleeve 78 having an inner peripheral flange 79 projecting internally of the flanges 75 of the neck mold halves 74 and downwardly into the mold space 72 to cooperatively define the mold space 76 with the flanges 75, i.e., the interior ring flange 79 defines the inner surface of the mold space 76 while the neck mold flanges 75 define the exterior surfaces thereof.

Projecting vertically downwardly through the ring 77 and depending into the mold space 72 is an internal parison sleeve indicated generally at 80 and comprising an upper cylindrical wall portion 81 projecting axially through the flanges 79 and a lower tapered portion 82 defining the interior surface of the mold space 72 and terminating in a lower peripheral edge 83 in spaced relation to the supply block 66. Projecting axially of the parison sleeve 80 is a valve actuating rod 84 terminating in a radially enlarged valve head 85 normally abutting the terminal edge 83 of the sleeve portion 82, this head 85 thus being interposed between the sleeve 82 and the supply block 66.

The overall apparatus illustrated in FIG. 19 of the drawings is disclosed in greater detail in my application Ser. No. 146,686, now abandoned, while the reciprocating screw plasticizer-extruder 50 is of the type disclosed in greater detail in the copending application of Hans G. Stenger, Ser. No. 185,757, filed Apr. 6, 1962, and assigned to the assignee of the present invention, and now Pat. No. 3,188,691.

In operation, the motor 61 is actuated to rotationally drive the screw 52, while the ram 69 is actuated by the cylinder 69a across the aperture 68 to isolate the bore 67 from the barrel outlet opening 65. Rotation of the screw 52 will displace to the right the particulate plastic material containing the foaming agent entering the barrel bore 56 through the aperture 54 from the hopper 55. The design of the screw 52 is such that this material becomes plasticized and is maintained under heat and pressure conditions such that the foaming agent is ineffective to cause foaming of the material while the material is confined within the bore 56. This plasticized material will be accumulated under pressure between the righthand outlet end of the screw 52 and the ram 69, the accumulation of the material forcing the screw 52 backwardly against the back pressure of the cylinder 62 in the manner described in connection with the above identified Stenger application.

After such a body of plasticized material under pressure has been accumulated, the ram 69 need merely be actuated downwardly by the cylinder 69a as the screw 52 is advanced to the right by the cylinder 62, thereby depositing in the bore 69 a charge of material which is plasticized and still in a nonfoamed condition. The ram 69 is now actuated upwardly by means of the cylinder 69a to deposit this charge of material in the parison mold space 72 and in the neck mold space 76. Thus, the ram 69 acts as the pressure generating element for an injection mold, this mold being defined by the parison mold sections 71, the internal sleeve 80, the internal neck flange 79 and the external neck ring flanges 75 and by the ram 69 which closes the open bottom of the mold space 72. The plasticized material will be injected into, and injection molded within, the mold spaces 72, 76 in such manner as to form a completely injection molded parison, indicated generally at 90 in FIG. 19.

Preferably, the neck mold flanges 75 and the internal flanges 79 are chilled by an external chilling means while the material filling the parison mold space 72 is not chilled to the same extent. However, the material in both the mold chambers 72, 76 is maintained under injection pressure which is greater than the vapor pressure which can be generated internally of the plasticized material by the gas liberated therein by the foaming agent. Thus, substantially no foaming occurs during the injection molding portion of the cycle illustrated in FIG. 19.

Of course, there is necessarily going to be some chilling of the material in the parison mold 70 but substantially less chilling effect will be obtained, due to the differential chilling exerted by the circulation of water for cooling and warming through the passages described in my above identified application. As a result, those portions of the plasticized material in the upper chamber 76 will be substantially completely solidified as above explained in connection with earlier embodiments of the invention, while only interior and exterior surface skins of relatively minute thickness, substantially less than the overall thickness of the plasticized material confined in the parison mold 72, will be formed in the parison mold.

Next, the injection molded parison is stripped from the parison mold while retaining those elements defining the neck mold chamber 76 in position. This operation is illustrated in FIG. 20 of the drawings, and this operation preferably is carried out by vertically upwardly displacing the neck mold section 72, the sleeve 77, the ring flange 79, the sleeve 80 and the associated valving parts 84, 85.

Figure 20:
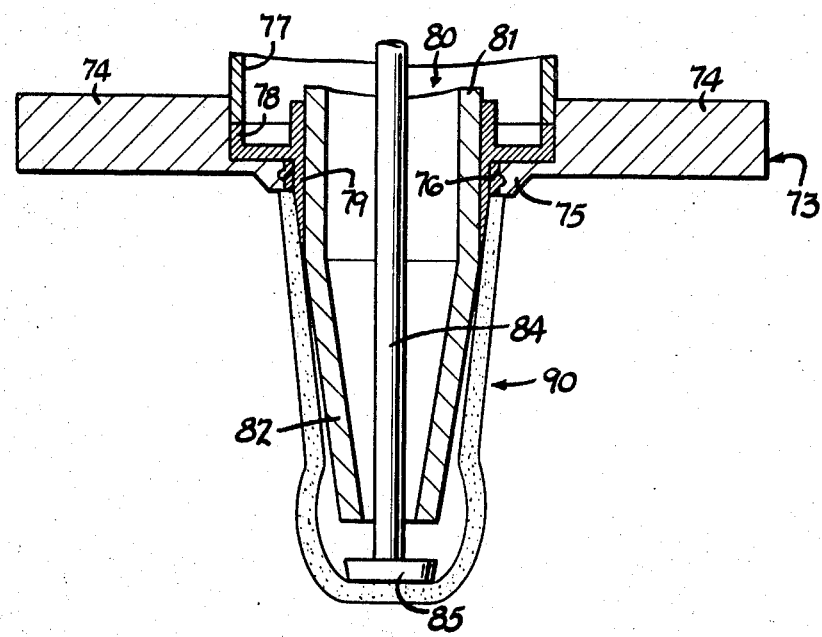
Figure 21:
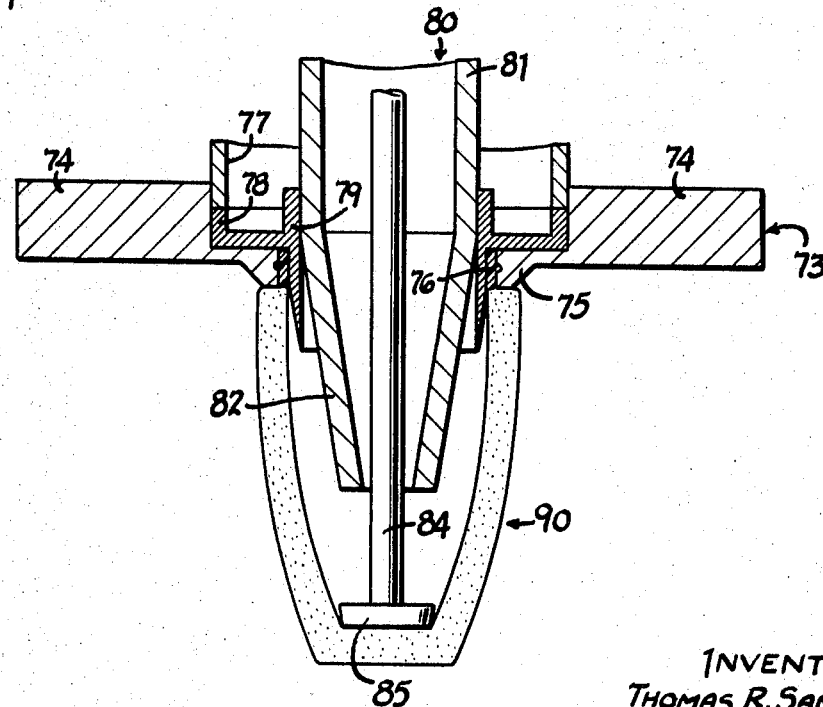
Figure 22:
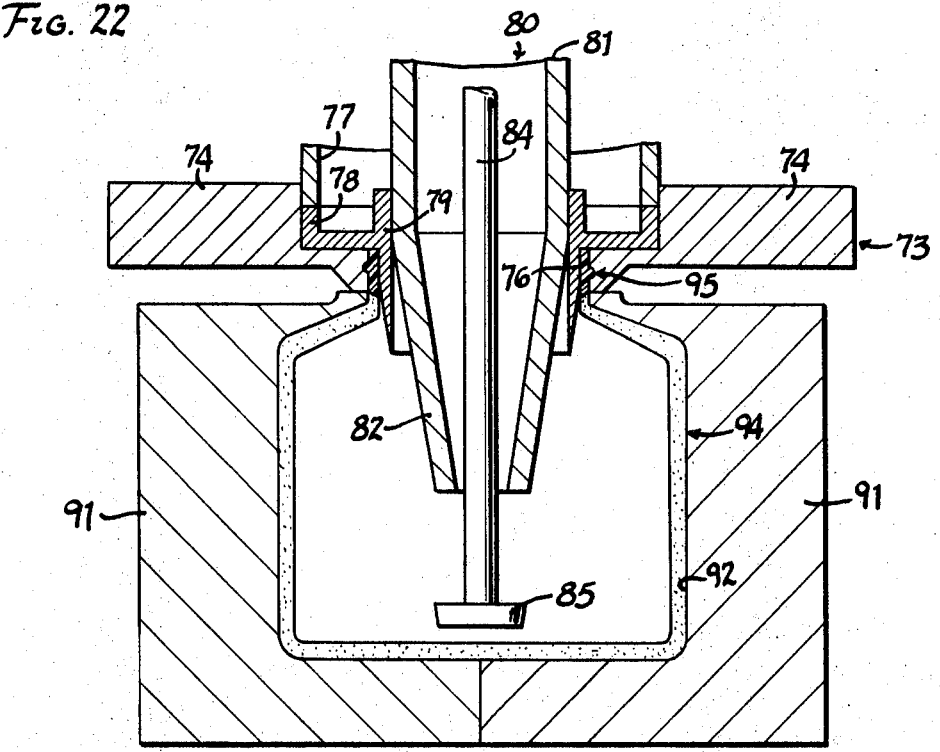

During or immediately after this upward stripping motion which may, if desired, be aided by lateral relative separation of the parison mold sections 71, the valve stem 84 is preferably actuated downwardly, as illustrated in FIGS. 20 and 21, and a relatively minute quantity of blow-air under a low pressure is introduced through the sleeve 80 into the parison 90. The parison is thus somewhat inflated or "puffed" to move the parison radially outwardly away from the internal sleeve portion 82, this sleeve portion being moved vertically upwardly to expose the internal surfaces of the parison to the blow air.

Once the parison is stripped from the parison mold sections 71, the parison is subjected to atmospheric pressure conditions and, since the parison is still warm, the foaming agent incorporated in the plasticized material can now liberate the foaming or cellulating gas to foam the plasticized material. However, due to the relative, controlled chilling of the internal and external surfaces of the lower portion of the parison during the injection molding, a chilled skin is formed thereon both internally and externally of this portion of the parison, and any subsequent foaming will be confined between these skins. As a result, foaming will occur as may be readily ascertained by a comparison of the parison, as illustrated in FIGS. 19, 20 and 21.

Finally, the puffed or partially inflated parison of FIG. 21 is transferred to a blow molding station at which the lower portions of the parison are enclosed in a pair of separable blow mold sections, indicated at 91, these blow mold sections cooperatively defining an internal cavity 92 conforming to the configuration of the final blown body portion of the container. After the parison has been so enclosed, blow air at a relatively high pressure, i.e., on the order of 100 pounds per square inch, is introduced into the parison and the parison is inflated against the walls of the blow mold sections to its final configuration. As illustrated in the greatly enlarged cross-sectional view of FIG. 23, the neck or finish 93 of the final container 95 is integral with the body portion of the container indicated generally at 94.

Referring now to the body portion 94 of the container, it will be noted that this portion consists of an exterior or outer skin 96 and an interior or inner skin 97 having interposed therebetween foamed cellular material 98. As above described, the exterior skin 96 results from contact between the injection molded material filling the parison mold and contacting the parison mold sections, while the inner surface 97 is the result of contact between the plasticized, initially nonfoamed material and the parison sleeve. The foamed inner portion 98 is formed by the foaming which occurs during formation of the blowable bubble illustrated in FIGS. 20 and 21, this formation of a bubble occurring after the injection molding pressure has been released. Thus, the skins 96, 97 at the exterior and interior surfaces of the container are formed during the injection molding cycle while the intermediate foamed portion 98 is subsequently formed after the pressure of injection molding has been relieved and the conditions are such that the internal pressures generated by the foaming agent, i.e., the vapor pressure of the gases evolved by the foaming agent, exceed the external pressure upon the parison.

Referring now to the injection molded finish 93, it will be seen that this finish is substantially noncellular due to the fact that the neck mold space is retained closed during the complete forming cycle, even though the injection molding pressure is relieved immediately prior to stripping of the subsequently blown parison portions from the parison mold halves. Further, the neck mold is chilled by external chilling means to an extent substantially greater than the chilling effect which is exerted upon the remainder of the parison, so that substantially all of the finish is chilled to a temperature such that foaming does not occur even though the pressure is relieved. However, the innermost portions of the finish may be at a temperature such that some foaming can occur following the relieving of the injection molding pressure, and it may well be that isolated pockets of foamed material will occur in the finish, such pockets being indicated by reference numeral 99. However, the finish is still substantially noncellular and whatever foaming may occur must necessarily occur only internally of the finish and between the smooth, dense, noncellular surface portions of the finish, indicated by reference numerals 100 and 101, respectively.

Further, it will be noted that there is a transition zone of cellular material indicated by reference numeral 102 interposed between the finish 93 and the body 94 of the article, as heretofore described.

Finally, the body 94 of the article is of enhanced structural strength because of the "sandwich" structure provided by the external, dense, smooth layers 96, 97 having the foamed or cellular structure 98 interposed therebetween. Additionally, the body portion is less permeable to fluids, either gaseous or liquid, by virtue of surface layers 96, 97, thereby enhancing the commercial acceptability of the container for liquid storage and dispensing.

THE EMBODIMENT OF FIGS. 24 THROUGH 27

In that form of the invention illustrated in FIGS. 24 through 27, inclusive, there is disclosed another method for making a container. In this instance, the container is of a slightly different type in that it has an enlarged peripheral opening which can properly be termed a "finish." Since this finish is adapted to receive a closure, such as a cap, telescopically fitted over the finish and engaging either the inner or the outer periphery thereof, the same problems exist as heretofore discussed in connection with the earlier embodiments of the present invention, if this finish were completely cellular.

As illustrated in FIG. 24 of the invention, plasticized material is supplied through a supply channel or bore 111 formed in an ejection nozzle 112 to a mold space 113 defined between an upper injection mold element 114 and a lower injection mold element 115. The upper surface 116 of the lower injection mold element 115 is preferably planar in configuration and is provided with a central opening 117 through which the plasticized material is supplied from the channel 111. The undersurface of the upper mold element 114 is recessed to provide a substantially planar blank having an outer peripheral edge 118, an upwardly projecting concave recess 119 adjacent the annular edge, and a downwardly and inwardly, slightly convex surface 120. The upper mold element 114 is provided with a central cylindrical recess 121 communicating with an upper, generally cylindrical bore 122 receiving therein a vertically displaceable blowing plug, indicated generally at 123. This plug 123 has an enlarged head 124 seated in the recess 121 with the undersurface 125 of the head defining the central portion of the mold space 113. The head is integrally formed with a vertically upwardly projecting actuating stem 126 having a central, axial recess 127 communicating with a pair of transverse fluid ports 128 for a purpose to be hereinafter more fully described.

From an inspection of FIGS. 24 and 25 it will be seen that the injection of plasticized material into the mold space 113 results in the formation of a substantially circular disc-like blank 130 having its outer periphery provided with an upwardly enlarged terminal embossment 131 and having a flat, inwardly tapering central portion 132 joining the enlarged rim 131 to a central circular portion 133 of substantially reduced thickness directly underlying the enlarged head 124. Additionally, it will be noticed that the upper mold element 114 is provided with a pair of coolant passages 135 positioned immediately adjacent the annular rim or flange 131 of the blank and serving to aid in extracting heat from the peripheral edge 131 of the blank during the injection molding portion of the cycle illustrated in FIG. 24.

Following the formation of the substantially planar blank 130, the blank is stripped from the injection mold 110 by relative displacement of the mold elements 114, 115, the blank adhering to the upper mold section 114 as the mold section is positioned over a blow mold, indicated generally by reference numeral 140 in FIG. 25. This blow mold 140 has an internal recess 141 conforming to the final desired configuration of the article to be formed and having a lowermost internal recess 142 within which is positioned an ejection head 143 formed integrally with an actuating stem 144. Upon actuation of the ejection head 143 upwardly, the blow molded article can be stripped from the unitary blow mold 140. Further, if desired, the ejection head is provided with vacuum passage 145 extending axially of the stem 144 and communicating with transverse cross passages 146 which are vented to the recess 142. By means of the vacuum passages 145, 146 the interior recess 141 of the mold can be evacuated to aid in the subsequent blowing operation, as will be hereafter more fully described.

From FIG. 26, it will be seen that the blowmolding operation is carried out in conjunction with the physical stretching of the blank 130. Further, it will be noted that the blow mold 140 is provided with an internal ledge or shoulder 147 upon which the upper injection mold section 114 is seated prior to the blow molding operation. This internal ledge 147 projects inwardly, as at 148, to underlie the outermost lower peripheral portion of the chilled edge of the blank 130. This ledge is provided to cooperate in conjunction with the upper mold recess 119 to retain the edge flange 131 of the blank 130 in position during the subsequent processing of the blank.

For example, as illustrated in FIG. 26 of the drawings, the mold element 123 is initially actuated downwardly to carry the central portion 133 of the blank downwardly inside of the blow mold recess 141 until such time as the central portion 133 of the blank is snugly confined between the enlarged head 124 and the ejector head 143. Of course, by this action, the medial portions 132 of the blank 130 are substantially stretched. This stretching action is confined to the portion 132 by contact of the head 124 with the central blank portion 133 and by retention of the marginal blank portion 131 in the manner heretofore described.

Preferably, during this stretching of the blank portion 132, the blow mold recess 141 is evacuated by means of the suction passages 145, 146. Thus, the pressure within the recess 141 and the pressure exerted upon the medial portion 130, and the central portion 133 of the blank will be no greater than atmospheric pressure, and the blowing agent in the still plasticized material can effect blowing of the blank to a cellular structure.

However, the initial injection molding of the blank 130 has formed an exterior skin on the portions 132 and 133 in the blank in the manner heretofore described in connection with the embodiment of FIGS. 19 through 23, while the peripheral portion 131 of the blank has been stabilized in a substantially nonexpanded or foamed condition by means of the circulation of the coolant fluid through the passages 135. Thus, the foaming within the blank portions 132 and 133 will be confined between previously chilled interior and exterior skin surfaces.

Upon final blowing by the introduction of blow air through the central air vent passage 127 and the transverse air pasage 128 of the element 123, a blown article 150, illustrated in FIG. 27 of the drawings, will result. This article 150 consists of a body portion 151 having an exterior skin surface 152 and an interior skin surface 153 between which the walls are foamed to a cellular structure, indicated at 154. The article 150 further has an upper peripheral finish portion, indicated generally at 155, which has been chilled sufficiently during the injection molding cycle to a substantially noncellular structure.

Of course, the injection molding pressure is released during the transfer of the injection molded blank 130 from the injection mold of FIG. 24 to the blow mold of FIG. 25 and this pressure also does not exist during the stretching and blowing operation. As a result, there may occur certain localized foam areas 156 in the finish portion 155. However, these localized areas 156 are completely surrounded by noncellular surfaces which are smooth and dense to provide the finish portion essential to a commercially acceptable container.

SUMMARY

It will be readily seen that the present invention provides a novel article, such as a container, having exceptionally desirable characteristics and possessing exceptional economic advantages. Further, this invention provides a novel method of manufacturing such articles to take advantage of the characteristics of the materials utilized.

The more important and desirable characteristics of the article may be summarized as follows:

(1) The differential density (in the case of a container) of the finish and the body portion is of primary importance. This characteristic makes possible the provision of a container having a dense, hard, surface-smooth finish suitable for the reception of a sealing closure and of a character for adaptation for automatic sealing equipment. The less dense body portion materially reduces the cost of the over-all bottle without penalizing the desirable characteristic of the finish.

(2) The provision of a laminar body portion wherein the foamed portions thereof are confined between exterior and interior surfaces which are smooth, hard, dense for appearance and ink reception at the outer surface and which are hard and dense for product impermeability at the inner surface. Of course, by controlled chilling in the injection mold only the exterior surface or only the interior surface may have such characteristics.

(3) The confinement of any cellular structure of the finish between the hard, already finished surface layers thereof insures complete filling of the mold and provides for the transition to the primarily cellular body portion without an abrupt, radical change in density or other characteristics.

(4) The transition zone (which ocurs in the shoulder portion of a container) again provides for the change from the dense finish to the foamed container body and provides an overall integrated structure of increased flexing strength, since there is no sharp line of demarcation between the container portions of widely varying densities.

(5) Since the density of the body portion is substantially less (preferably at least one-third less) than the density of the plasticized material, or the material before foaming, important economic advantages can be obtained in that less material is required to manufacture a container of a given size or interior volume. Further, the foamed material constituting the body is cellular and of a high strength-to-weight ratio, particularly when the laminar structure of FIGS. 23 and 27 is utilized.

The method of the present invention is also desirable for several reasons which may be summarized as follows:

(1) The injection molding of the finish is important to obtain an accurately dimensioned, stable and substantially noncellular structure which is not disturbed or otherwise processed during the foaming of the subsequently formed body portion. In other words, the finish is injection molded to its final configuration and changed to a stable, finished state prior to the release of the injection molding pressure and prior to the formation of the container body portion.

(2) The body portion is formed during the formation of the blowable bubble which is subsequently blown to its final configuration. Of course, this foaming step requires the presence of the material in a plasticized state and at a pressure less than the vapor pressure generated interiorly of the material by the foaming agent. By proper chilling of the previously formed finish and by formation of the blowable bubble after formation of the finish, these conditions can be readily obtained.

(3) The formation of the blowable bubble can occur in several different ways, i.e., by pinching shut an open ended extruded tube, by puffing or partially inflating an injection molded shape, or by deflating a relatively flat injection molded shape to a blowable shape. In any event the blowable bubble is formed uniformly after the finish has been formed and substantially stabilized without foaming.

(4) Where the subsequently foamed portion of the articles are initially formed and partially chilled prior to the subjecting of the material to foaming conditions, interior and/or exterior skins can be formed between which any subsequent foaming is confined. In a method sense, this is primarily a matter of heat control and the extent, thickness, surface characteristics and other aspects of this skin formation can be readily varied and controlled.

(5) Of course, the material must remain plasticized, i.e., above its crystalizing point, throughout the blow molding portions of the cycle and some final foaming may well occur during the blowing and prior to the chilling of the container surfaces by their contact with the blow mold walls. This affords another process variable by which the extent of foaming may be varied.

(6) The method may be utilized to manufacture articles other than blow molded containers and the like, e.g., the stopper construction illustrated in FIG. 18 of the drawings and formed by the process of FIGS. 16 through 18, inclusive. This method utilizes the the steps of injection molding and subsequent forming by foaming but does not utilize blow molding as a final forming operation. In any event, the article of FIG. 18 is formed by injection molding at an elevated pressure and foaming at a substantially reduced pressure following extrusion.

What is claimed is:

1. In a method of making a container having a finish portion and a body portion from plasticized thermoplastic material containing an intimately dispersed foaming agent capable of liberating a gas in said plasticized material at a predetermined vapor pressure under given temperature and pressure conditions, the steps of (1) injection molding and chilling said finish portion of said container to a final configuration in a closed mold of annular cross-section at a super-atmospheric pressure greater than the vapor pressure of the gas liberated in said material by said agent; (2) injection molding, while chilling to a substantially lesser extent, additional material from which the container body portion is to be formed; (3) said additional material at the conclusion of step (2) having nonfoamable inner and outer skins and a foamable intermediate layer; (4) releasing the injection molding pressure; (5) forming said additional material into a blowable bubble at substantially atmospheric pressure; (6) enclosing the blowable bubble in a blow mold; (7) injecting air under pressure into said enclosed bubble to inflate the bubble to the final configuration of the body portion of said container; and (8) accommodating foaming of the foamable intermediate layer of said additional material between said skins during the performance of the steps (4) through (7) above set forth.

2. A method as defined in claim 1, wherein step (2) is carried out by injection molding the second portion to an essentially planar configuration, and step (5) is carried out by deflecting the second portion to a blowable concave-convex configuration.

3. A method as defined in claim 1, wherein step (2) is carried out by injection molding the second portion between nested, concentric surfaces to an essentially concave-convex configuration and step (5) is carried out by stripping the second portion from said surfaces.

4. In a method of making an article having a first injection molded portion and a second blow molded portion, said portions having substantially different densities, and being integrally formed from the same foamable plastic material containing an intimately dispersed foaming agent capable of liberating a gas in said material when subjected to a pressure less than the vapor pressure of the liberated gas at the ambient temperature; the steps of injecting plasticized material into a closed mold, a first part of which mold conforms accurately to the first portion of said article and a second part of which mold preforms between cooperating mold surfaces additional material from which the second portion of said article shall be blow molded, said injection occurring at a pressure in excess of said vapor pressure at the injection temperature of said material; chilling said first mold part and said first article portion to an extent such that said first article portion assumes a nonfoamable, dimensionally stable state; chilling said second mold part and these portions of said additional material in direct contact therewith to form nonfoamable skin surfaces thereon; opening said second mold part prior to complete solidification of said additional material to expose said additional material, thereby subjecting that portion of said additional material intermediate said skin surfaces to atmospheric pressure which is substantially less than said vapor pressure of the liberated gas at the residual temperature of said additional material, whereupon said foaming agent liberates gas in said portion of said additional material between said skin surfaces to foam said portion; and blowing said additional material including both said skin surfaces and said foamed portion therebetween to the final configuration of the second portion of said article.

References Cited

UNITED STATES PATENTS

| | | | |
|---|---|---|---|
| 3,137,745 | 6/1964 | Johnstone | 264—54 |
| 3,144,493 | 8/1964 | Santelli | 264—51 |
| 3,145,240 | 8/1964 | Proulx et al. | 264—53 |
| 3,225,127 | 12/1965 | Scott | 264—54 |
| 3,389,197 | 6/1968 | Flynn et al. | 264—51X |
| 3,218,375 | 11/1965 | Hardwick | 264—51X |
| 3,249,660 | 5/1966 | King | 264—51 |
| 3,268,635 | 8/1966 | Kraus et al. | 264—51X |

PHILIP E. ANDERSON, Primary Examiner

U.S. Cl. X.R.

264—48, 51, 97